United States Patent
Jung

(10) Patent No.: US 10,348,064 B2
(45) Date of Patent: Jul. 9, 2019

(54) SUBMODULE

(71) Applicant: LSIS CO., LTD., Anyang-si, Gyeonggi-do (KR)

(72) Inventor: Teag Sun Jung, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/869,957

(22) Filed: Jan. 12, 2018

(65) Prior Publication Data

US 2018/0316163 A1 Nov. 1, 2018

(30) Foreign Application Priority Data

Apr. 28, 2017 (KR) .................. 10-2017-0055458

(51) Int. Cl.
| | |
|---|---|
| *H02B 1/26* | (2006.01) |
| *H02B 1/24* | (2006.01) |
| *H02B 1/46* | (2006.01) |
| *H02B 1/52* | (2006.01) |
| *H02B 1/56* | (2006.01) |
| *H02B 1/20* | (2006.01) |
| *H02J 3/18* | (2006.01) |
| *H02J 3/28* | (2006.01) |

(52) U.S. Cl.
CPC ............ *H02B 1/24* (2013.01); *H02B 1/20* (2013.01); *H02B 1/46* (2013.01); *H02B 1/52* (2013.01); *H02B 1/56* (2013.01); *H02J 3/18* (2013.01); *H02J 3/28* (2013.01)

(58) Field of Classification Search
None
See application file for complete search history.

(56) References Cited

U.S. PATENT DOCUMENTS

| | | | | |
|---|---|---|---|---|
| 5,337,214 A | * | 8/1994 | Lindsey | H01H 50/047 174/16.3 |
| 5,978,220 A | | 11/1999 | Frey et al. | |
| 6,118,676 A | * | 9/2000 | Divan | H02J 3/1814 323/207 |
| 7,978,471 B2 | * | 7/2011 | Tokuyama | H01L 23/36 361/699 |
| 8,730,672 B2 | * | 5/2014 | Ebersberger | H01L 23/473 174/15.1 |

(Continued)

FOREIGN PATENT DOCUMENTS

| | | |
|---|---|---|
| CN | 1112750 C | 6/2003 |
| CN | 103066859 A | 4/2013 |

(Continued)

OTHER PUBLICATIONS

Korean Office Action for related Korean Application No. 10-2017-0055458; action dated Aug. 14, 2018; (53 pages).

(Continued)

*Primary Examiner* — Courtney L Smith

(74) *Attorney, Agent, or Firm* — K&L Gates LLP

(57) ABSTRACT

A submodule includes a power pack including a plurality of switching modules, first and second input bus bars connected with the switching modules to protrude toward a first outside of the power pack and a bypass switch provided at the first outside of the power pack and coupled to the first and second input bus bars.

18 Claims, 11 Drawing Sheets

(56) References Cited

U.S. PATENT DOCUMENTS

| | | | | |
|---|---|---|---|---|
| 8,837,119 | B2* | 9/2014 | Kishimoto | H02M 5/271 |
| | | | | 307/126 |
| 9,042,112 | B2* | 5/2015 | Guan | H05K 7/1432 |
| | | | | 361/676 |
| 9,526,194 | B2* | 12/2016 | Fujita | H02M 7/003 |
| 9,668,376 | B2* | 5/2017 | Riedel | H02M 7/003 |
| 10,003,274 | B2* | 6/2018 | Takahashi | H02M 7/003 |
| 2014/0055888 | A1 | 2/2014 | Chimento et al. | |
| 2014/0160822 | A1* | 6/2014 | Kuwano | H02M 7/003 |
| | | | | 363/141 |
| 2015/0333660 | A1 | 11/2015 | Kim et al. | |
| 2016/0165759 | A1 | 6/2016 | Buschendorf et al. | |
| 2016/0203929 | A1 | 7/2016 | Jung | |
| 2017/0310152 | A1* | 10/2017 | Toyoda | H02J 9/06 |
| 2018/0026545 | A1* | 1/2018 | Numakura | H02M 7/48 |
| | | | | 361/689 |
| 2018/0278172 | A1* | 9/2018 | Tokuyama | H01L 23/04 |

FOREIGN PATENT DOCUMENTS

| | | |
|---|---|---|
| CN | 104578090 A | 4/2015 |
| CN | 103683857 B | 12/2015 |
| CN | 105429482 A | 3/2016 |
| CN | 105656057 A | 6/2016 |
| JP | 4765550 B2 | 9/2011 |
| KR | 960015125 B1 | 10/1996 |
| KR | 20130006368 A | 1/2013 |
| KR | 101389579 B1 | 4/2014 |
| KR | 20150078487 A | 7/2015 |
| KR | 20150104432 A | 9/2015 |
| KR | 101613812 B1 | 4/2016 |
| WO | 2015090367 A1 | 6/2015 |

OTHER PUBLICATIONS

Unknown; "High Voltage Direct Current Transmission System (HVDC)"; Aug. 22-26, 2016; (15 pages).

* cited by examiner

SUBMODULE

CROSS-REFERENCE TO RELATED APPLICATIONS

Pursuant to 35 U.S.C. § 119(a), this application claims the benefit of earlier filing date and right of priority to Korean Patent Application No. 10-2017-0055458 filed on Apr. 28, 2017 in Korea, the entire contents of which is hereby incorporated by reference in its entirety.

BACKGROUND

The present invention relates to a submodule.

With the development of industry and the increase of population, the demand for power has been rapidly increased but there is a limitation in producing power.

Accordingly, a power system for supplying power produced in a production site to a demand site has been gradually important.

The need for facilities, such as a flexible AC transmission system (FACT), has arisen to improve a power flow, a system voltage, and stability. A static synchronous compensator (STATCOME), which is a kind of a power compensation device called a third generation FACT among FACT facilities, is connected to a power system in parallel to compensate for active power and reactive power required in the power system.

FIG. 1 is a view illustrating a typical power system.

As illustrated in FIG. 1, a typical power system 10 may include a power generation source 20, a power system 30, a load 40, and a plurality of power compensation devices 50.

The power generation source 20, which refers to a place or facilities for generating power, may be understood as a producer who produces power.

The power system 30 may refer to all facilities including power lines, steel towers, lightning arresters, insulators, and the like allowing the transmission of the power generated from the power generation source 20 to the load 40.

The load 40, which refers to a place or facilities for consuming the power generated from the power generation source 20, may be understood as a consumer who consumes the power.

The power compensation device 50 may be a device linked to the power system 30 to compensate for relevant reactive power or relevant active power due to the supply or the shortage of the active power or the reactive power of power flowing through the power system 30.

In the case of the power compensation 50, recently, an STATCOM based on modular multilevel converters (MMC) has been increased. The STATCOM based on the MMC includes a plurality of submodules and the submodules are provided therein with various devices.

Accordingly, since a conventional power compensation device has to include a plurality of submodules, the power compensation device may not be installed in a defined space.

SUMMARY

An object of the present invention is to solve the above-described problem and other problems.

Another object of the present invention is to provide a submodule having a novel compact structure.

In order to accomplish the above objects, according to an embodiment of the present invention, a submodule includes a power pack including a plurality of switching modules, first and second input bus bars connected with the switching modules to protrude out of the power pack, and a bypass switch provided outside the power pack and coupled to the first and second bus bars.

According to another embodiment of the present invention, a power compensation device includes a frame, a plurality of insulation unit provided in the frame, a plurality of cabinets provided in the frame and stacked between the first and second bus bars.

Each cabinet includes a submodule unit in which a plurality of submodules are connected with each other in series.

The submodule may be a submodule configured according to one embodiment of the present invention.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Figure 1:
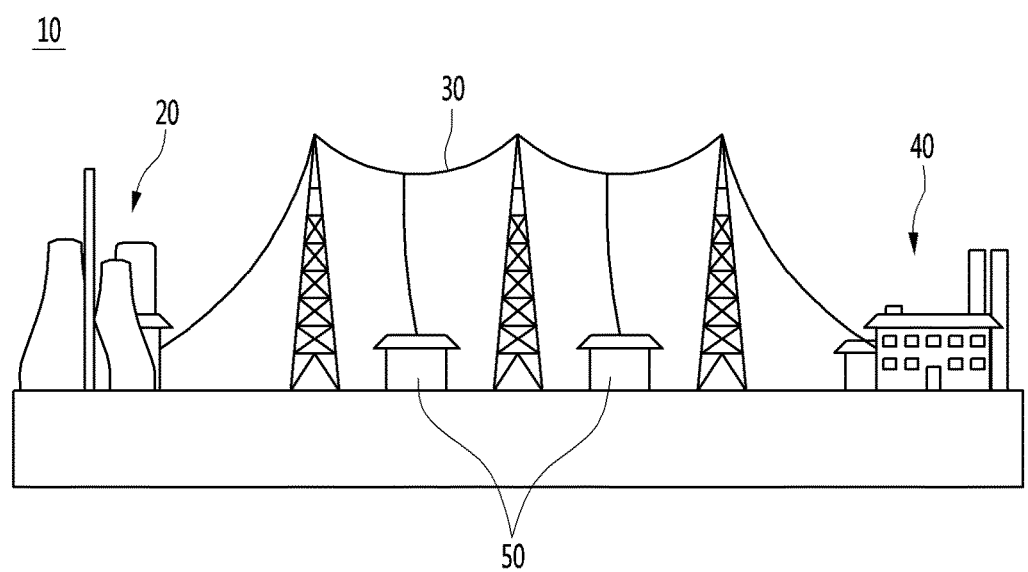
FIG. 1 illustrates a typical power system.

Hereinafter, embodiments disclosed in this specification will be described in detail with reference to accompanying drawings. In addition, the same elements or similar elements will be assigned with the same reference numerals and the redundant details thereof will be omitted. In the following description, suffixes "module" and "part" for elements are provided or mixed by taking into consideration only the easy drafting of the specification, and the suffixes have no inherent meaning or inherent function. Further, in the following description of the embodiments disclosed in this specification, if the details of the related art are determined to make the subject matter of the embodiments unclear, the details of the related art may be omitted. In addition, the accompanying drawings are provided to allow those skilled in the art to easily understand the embodiments disclosed in this specification, but the technical scope disclosed in this specification is not limited by the accompanying drawings. In addition, those skilled in the art should understand that all variations, all equivalents, and all alternatives are possible within the technical scope of the present invention.

Figure 2:
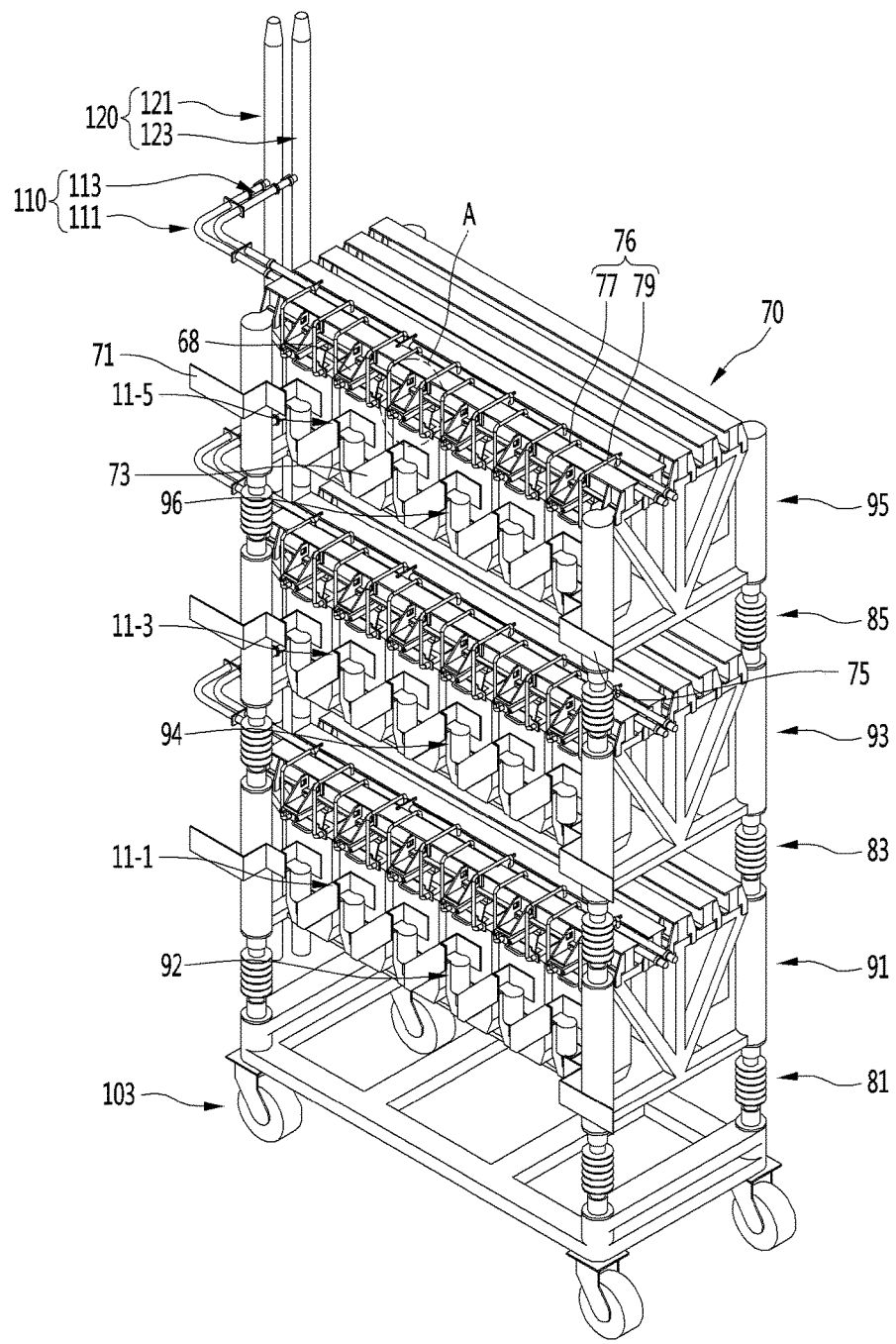
FIG. 2 illustrates a power compensation device based on an MMC according to the present invention.

FIG. 2 illustrates a power compensation device based on an MMC according to the present invention.

Referring to FIG. 2, the power compensation device according to the present invention may include a plurality of insulation units 81, 83, 85 and a plurality of cabinets 91, 93, and 95 provided in a frame 70 and stacked. For example, a first cabinet 91 may be positioned on a first insulation unit 81, a second insulation unit 83 may be positioned on the first cabinet 91, and a second cabinet 93 may be positioned on the second insulation unit 83. In addition, a third insulation unit 85 may be positioned on the second cabinet 93 and a third cabinet 95 may be positioned on the third insulation unit 85.

The insulation units 81, 83, and 85 may be spaces in which at least one insulator is installed. The cabinets 91, 93, and 95 may be spaces for receiving submodule units 11-1, 11-3, and 11-5 having a plurality of submodules 92, 94, and 96 connected with each other in series.

The insulation units 81, 83, and 85 positioned among the cabinets 91, 93, and 95 may insulate the submodule units 11-1, 11-3, and 11-5 received in the cabinets 91, 93, and 95, respectively.

The first submodule 11-1 received in the first cabinet may include a plurality of submodules 92 for converting a first phase voltage, for example, an 'a'-phase voltage which is among three phase voltages. The second submodule 11-3 received in the second cabinet 93 may include a plurality of submodules 94 for converting a second phase voltage, for example, a 'b'-phase voltage which is among three phase voltages. The third submodule 11-5 received in the third cabinet 95 may include a plurality of submodules 96 for converting a third phase voltage, for example, a 'c'-phase voltage which is among three phase voltages.

An input bus bar 71 may be connected with a first submodule among the submodules 92, an output bus bar 75 may be connected with the last submodule among the submodules 92, and a connection bus bar 73 may be connected with other submodules among the submodules 92.

The submodules 92, 94, and 96 may be introduced into the cabinets 91, 93, and 95, respectively, through guide sliding rail units 68 mounted on the cabinets 91, 93, and 95.

Although FIG. 2 illustrates three cabinets 91, 93, and 95 and three insulation units 81, 83, and 85 for the convenience of explanation, the number of the cabinets 91, 93, and 95 and the number of 81, 83, 85 may be varied depending on the necessity of a user, which does not limit the scope of the present invention.

The frame 70 may have a wheel 103 mounted on the bottom thereof to move, but the present invention is not limited thereto.

The frame 70 having a heavy load may easily move to a target place by the wheel 103.

If the frame 70 is fixed to a specific place, the wheel 103 may be omitted.

According to an embodiment, the power compensation device may include a main pipe 120 placed on one side of the frame 70, a plurality of branch pipes 110 branching from the main pipe 120 to the cabinets 91, 93, and 95, respectively and a plurality of sub-branch pipes 76 branching from the branch pipes 110 and connected with the submodules 92, 94, and 96.

The main pipe 120 may include a first main pipe 121 for introducing coolant and a second main pipe 123 for withdrawing the coolant. The branch pipe 110 may include a first branch pipe 111 connected with the first main pipe 121 to introduce the coolant and a second branch pipe 113 connected with the second main pipe 123 to output the coolant. The sub-branch pipes 76 may include a first sub-branch pipe 77, which connects the first branch pipes 111 with water inlet sides of the submodules 92, 94, and 96 to introduce coolant into the water inlet sides of the submodules 92, 94, and 96, and a second sub-branch pipe 79 which connects the second branch pipe 113 with water outlet sides of the submodules 92, 94, and 96 to withdraw the coolant from the water outlet sides of the submodules 92, 94, and 96.

The main pipe 120 and the branch pipe 110 may be formed of stainless steel, and the sub-branch pipe 76 may be formed of a fluorinated polyvinylidene material.

The diameter of the branch pipe 110 may be smaller than the diameter of the main pine 120, and the diameter of the sub-branch pipe 76 may be smaller than the diameter of the branch pipe 110. Accordingly, the coolant withdrawn from the first main pipe 121 is introduced into the first branch pipe 111 placed on each of the cabinets 91, 93, and 95, and the coolant of the first branch pipe 111 may be introduced into each of the submodules 92, 94, and 96 through the relevant first sub-branch pipe 77 connected with a water inlet side of each of the submodules 92, 94, and 96. Heat generated from a plurality of switching modules (see reference numerals 17, 19, 21, and 23 of FIG. 5) installed in each of the submodules 92, 94, and 96 may be easily discharged to the outside by the coolant introduced into each of the submodules 92, 94, and 96. The coolant may circulate through each of the submodules 92, 94, and 96. For example, each of the submodules 92, 94, and 96 may include a cooling plate having a duct formed in a zig-zag pattern.

The coolant may be withdrawn to the second sub-branch pipe 79 connected with the water outlet side of each of the submodules 92, 94, and 96, and may be withdrawn to the second main pipe 123 through the second branch pipe 113 placed in each of the submodules 92, 94, and 96

However, the above description is provided for the purpose of explanation. If necessary, the branch pipe 110 may be formed in a different shape instead of the shape of a straight line, which does not limit the scope of the present invention.

Figure 3:
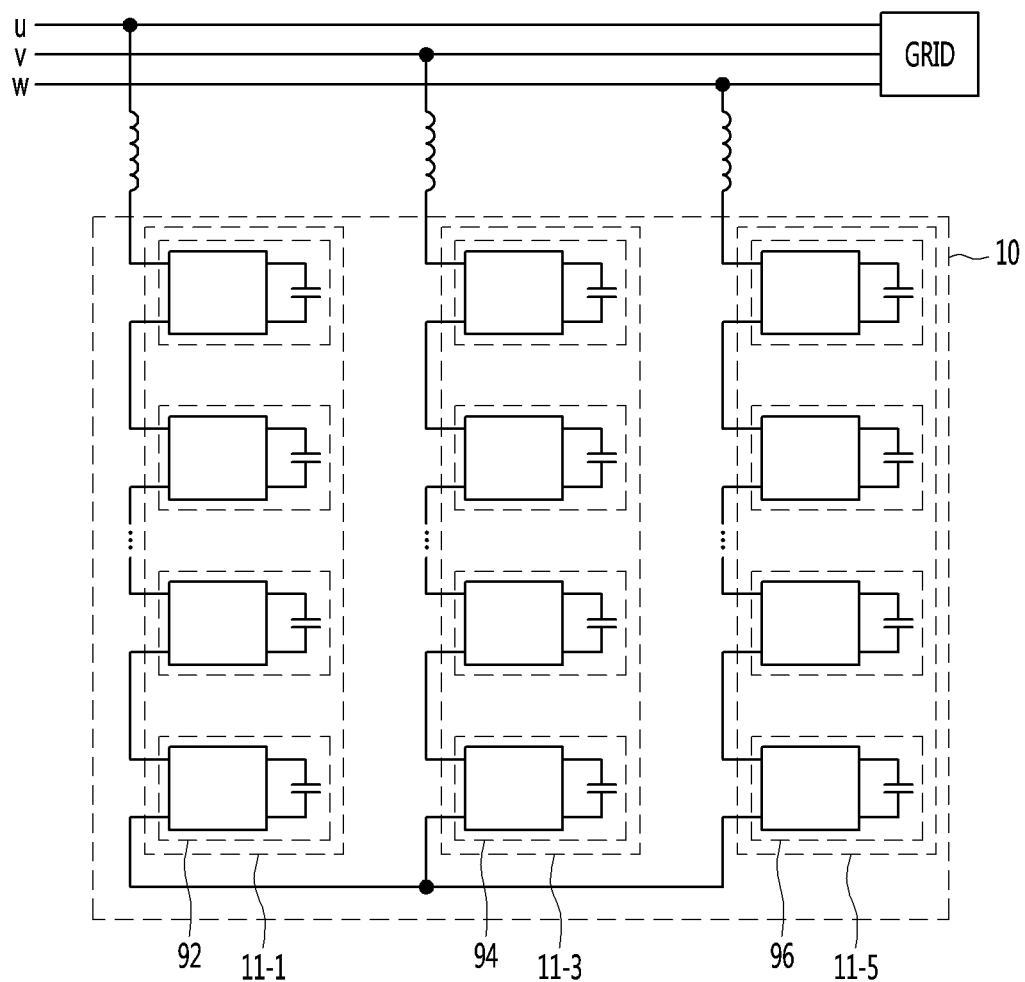
FIG. 3 illustrates a circuit diagram of the power compensation device based on the MMC according to the present invention.

FIG. 3 illustrates a circuit diagram of the power compensation device based on the MMC according to the present invention.

As illustrated in FIG. 3, the power compensation device 10 based on the MMC may include a plurality of submodules 92, 94, and 96 having series connections according to phases. As the submodules 92, 94, and 96 operate, active power or reactive power may be supplied to a power system or may be absorbed from the power system.

Although FIG. 3 illustrates a Y-type power compensation device, a Δ-type power compensation device may be applied to the present invention.

The submodules 92, 94, and 96 provided in each phase may serve as one valve, but the present invention is not limited thereto.

Figure 4:
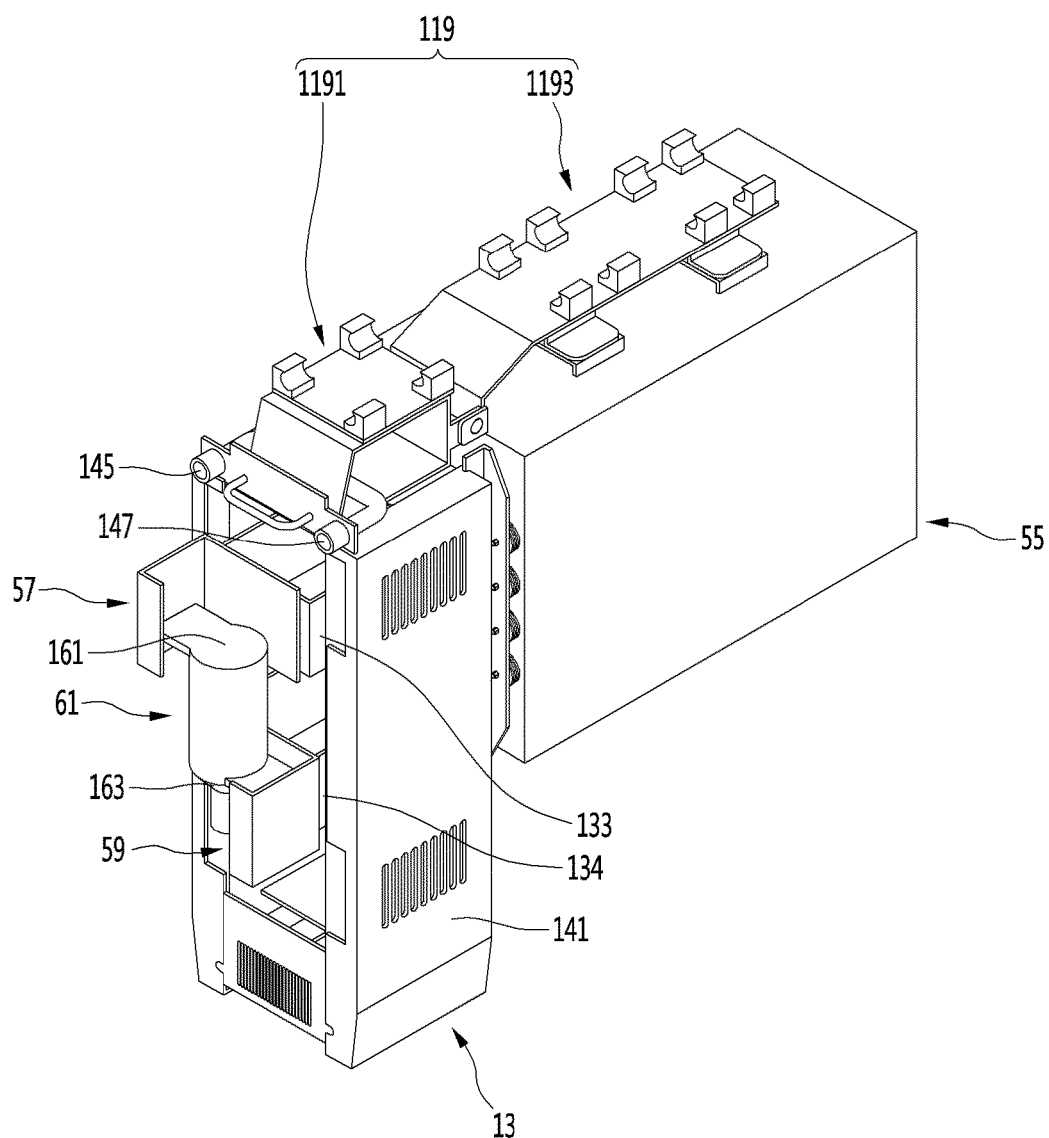
FIG. 4 is a perspective view illustrating a submodule according to an embodiment of the present invention.
Figure 5:
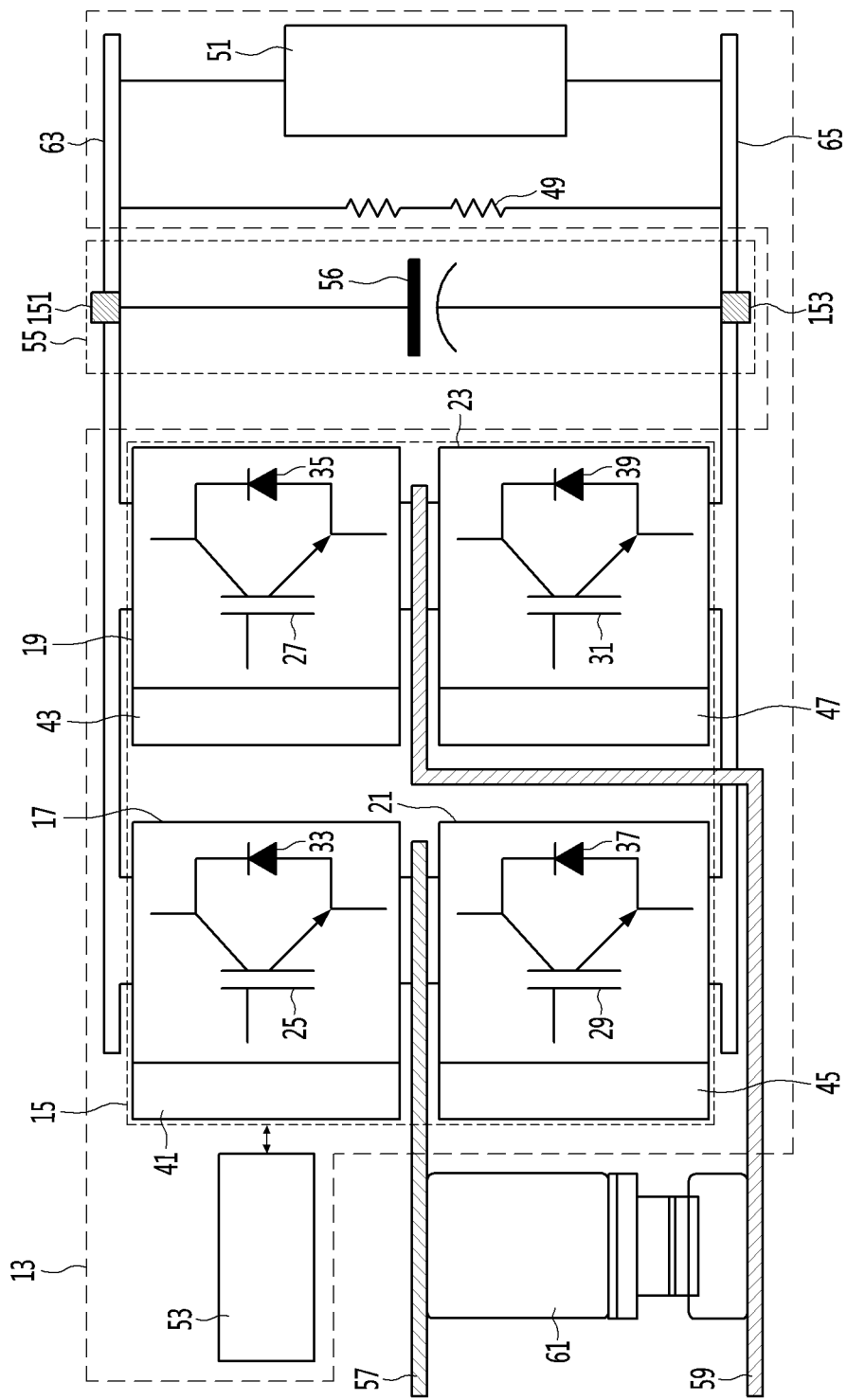
FIG. 5 is a circuit diagram illustrating the submodule according to an embodiment of the present invention.

FIG. 4 is a perspective view illustrating a submodule according to an embodiment of the present invention, and FIG. 5 is a circuit diagram illustrating the submodule according to an embodiment of the present invention.

Referring to FIG. 4, each of the submodules 92, 94, and 96 according to an embodiment of the present invention may include a power pack 13 and a capacitor back 55.

The power pack 13 and the capacitor pack 55 may be electrically connected with each other. The capacitor pack 55 may be charged or discharged by a switching operation of the power pack 13.

The capacitor pack 55 may include a case 141 and a capacitor device 56 installed in the case 141. The capacitor device 56 may store energy (power) input into each of the submodules 92, 94, and 96, and the energy may be used as power to drive various devices installed in the submodules 92, 94, and 96 and may be supplied to the power system in the form of reactive power.

The capacitor pack 55 may be electrically connected with the rear surface of the power pack 13.

First and second input bus bars 57 and 59 may be mounted to protrude out of the outside of the power pack 13, that is, forward the front from the front surface of the power pack 13. The first and second input bus bars 57 and 59 may be connected with a plurality of switching modules 17, 19, 21, and 23, which are mounted in the case 141, through the case 141. The first and second input bus bars 57 and 59 may be formed of a conductive material having superior electrical conductivity.

Through the first and second input bus bars 57 and 59, the active power or the reactive power absorbed from the power system is input or the energy charged in the capacitor device 56 may be output to the power system in the form of active power or reactive power.

Accordingly, the first and second input bus bars 57 and 59 may be named "first and second input terminals".

The first and second input bus bars 57 and 59 may have the shapes bent at least one time.

The first and second input bus bars 57 and 59 may be electrically connected with each other through a bypass switch (BPS: ByPass Switch) 61. In other words, a first switch terminal 161 of the bypass switch 61 may be connected with the first input bus bar 57 and a second switch terminal 163 of the bypass switch 61 may be connected with the second input bus bar 59.

The first input bus bar 57 may be mounted on a first area of a front surface of the case 141, and the second input bus bar 59 may be mounted on a second area positioned under the first area.

The bypass switch 61 may be formed to extend in a cylindrical shape between the first switch terminal 161 and the second switch terminal 163. The first switch terminal 161 has a first protrusion part protruding in a first horizontal direction from the top of the bypass switch 61. The second switch terminal 163 may have a second protrusion part protruding in a second horizontal direction, which is opposite to the first horizontal direction, from the bottom of the bypass switch 61.

The first input bus bar 57 may be coupled to the first protrusion part of the first switch terminal 161 by using a screw, and the second input bus bar 59 may be coupled to the second protrusion part of the second switch terminal 163 by using a screw.

Accordingly, based on the vertical axis of the bypass switch 61, the first input bus bar 57 coupled to the first protrusion part of the first switch terminal 161 is positioned at a first side, that is, a left side of the bypass switch 61, and the second input bus bar 59 coupled to the second protrusion part of the second switch terminal 163 may be positioned at the second side, that is, a right side of the bypass switch 61.

The bypass switch 61 may be spaced apart forward from the front surface of the case 141.

When an error occurs in at least a device including the switching modules 17, 19, 21, and 23 inside the power pack 13 and thus the device is failed, the bypass switch 61 may cause an electrical short between the first and second input bus bars 57 and 59 to bypass a current from the first input bus bar 57 to the second input bus bar 59 through the bypass switch 61, thereby eliminating the submodule including the relevant power pack 13 from the remaining submodules. In this case, the wording "the eliminating of the submodule" may refer to that the submodule is not used.

Since the bypass switch 61 is mounted outside the power pack 13, heat emitted from the bypass switch 61 is directly radiated to the outside so that the heat is naturally radiated. Accordingly, a separate heat radiation member for radiating the heat from the bypass switch 61 does not need to be added, thereby producing an economical effect.

The rear surface of the power pack 13 and the capacitor pack 55 may be coupled to first and second bus bars 63 and 65. The power pack 13 and the capacitor pack 55 may be electrically connected with each other. The first and second bus bars 63 and 65 may protrude out of the outside of the power pack 13, that is, toward the rear of the power pack 13. The connection relation between the power pack 13 and the capacitor pack 55 will be described later in detail.

The power pack 13 may be provided on the top thereof with a first sliding guide unit 1191 which corresponds to the guide sliding rail unit 68 mounted on the top of each of the cabinets 91, 93, and 95 to allow the power pack 13 to slide when the power pack 13 is introduced into each of the cabinets 91, 93, and 95.

Similarly, the capacitor pack 55 may be provided on the top thereof with a second sliding guide unit 1193 which corresponds to the guide sliding rail unit 68 mounted on the top of each of the cabinets 91, 93, and 95 to allow the capacitor pack 55 to slide when the capacitor pack 55 is introduced into each of the cabinets 91, 93, and 95.

The first and second sliding guide units 1191 and 1193 may be collectively named "sliding guide unit 119".

Although FIG. 4 illustrates that the first sliding guide unit 1191 and the second sliding guide unit 1193 are provided on the top of the power pack 13 and the top of the capacitor pack 55 for the convenience of explanation, respectively, the present invention is not limited thereto. If necessary, the first sliding guide unit 1191 and the second sliding guide unit 1193 may be modified to be provided on the bottom and/or the side surface of the power pack 13 and the bottom and/or the side surface of the capacitor pack 55, which does not limit the scope of the present invention. In this case, the guide sliding rail units 68 may be mounted on bottom portions or side portions of the cabinets 91, 93, and 95.

Hereinafter, the connection relation between the power pack 13 and the capacitor pack 55 or the inner arrangement of the power pack 13 will be described with reference to FIGS. 6 to 9.

Figure 6:
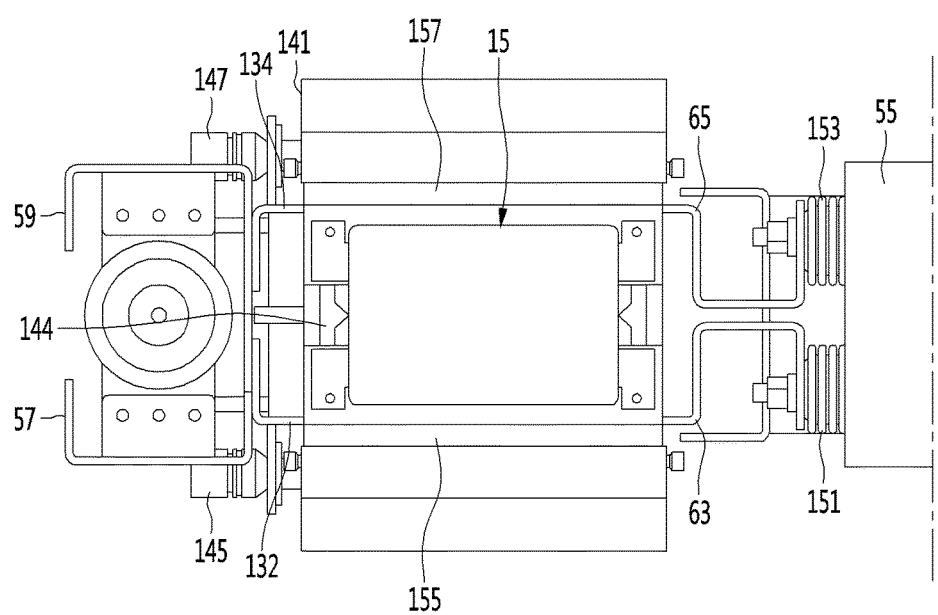
FIG. 6 is a rear view of the submodule.
Figure 7:
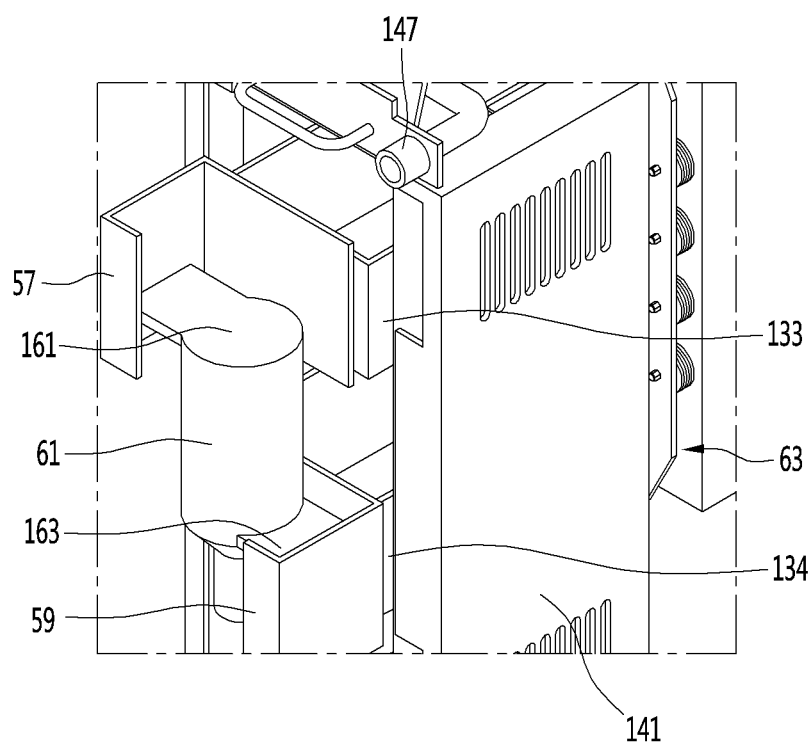
FIG. 7 is a side perspective view of the submodule.
Figure 8:
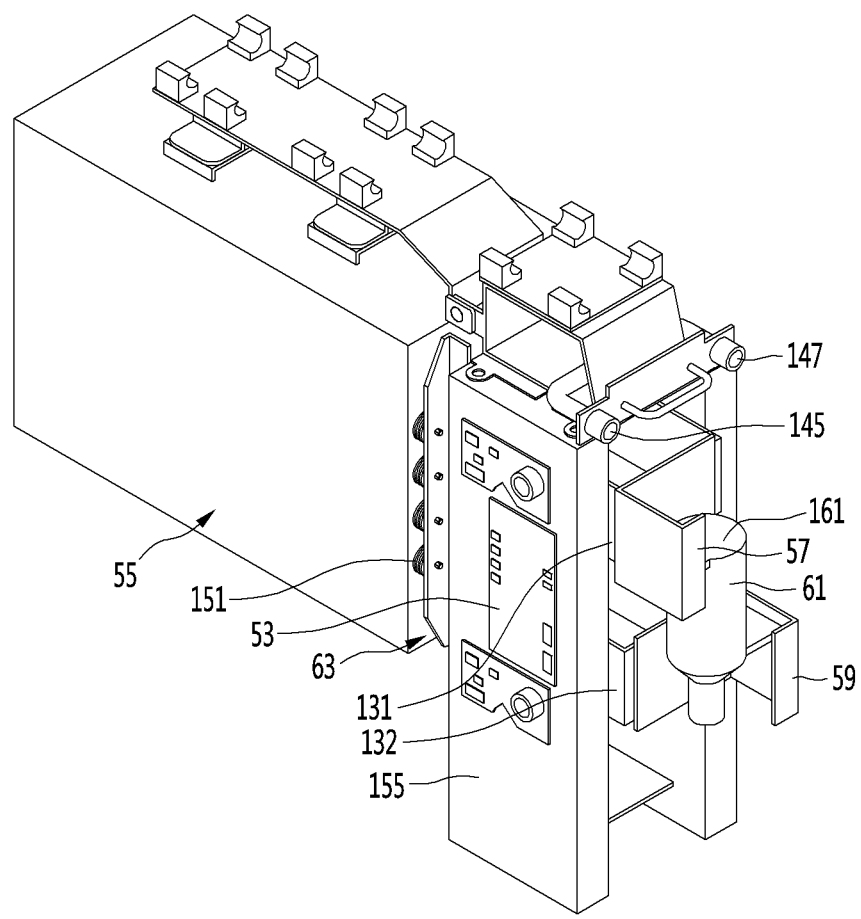
FIG. 8 is a perspective view illustrating one side surface after a case is removed.
Figure 9:
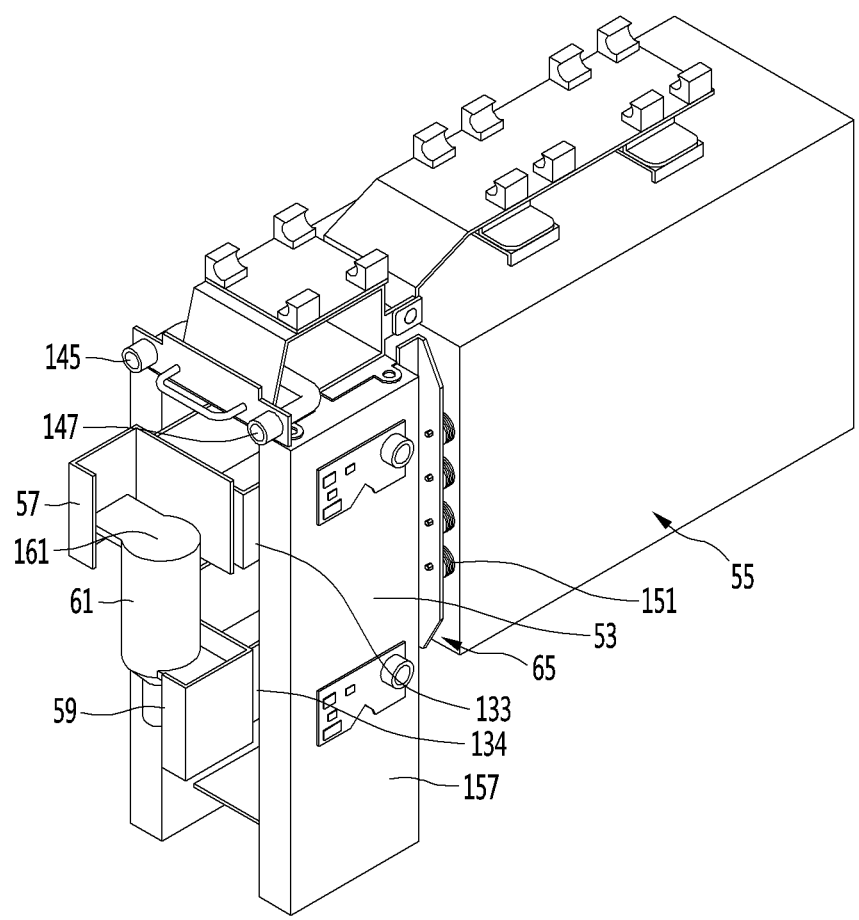
FIG. 9 is a perspective view illustrating an opposite side surface after the case is removed.

FIG. 6 is a rear view of the submodule and FIG. 7 is a side perspective view of the submodule. FIG. 8 is a perspective view illustrating one side surface after a case is removed, and FIG. 9 is a perspective view illustrating an opposite side surface after the case is removed.

Referring to FIGS. 6 to 9, first and second electrode terminals 151 and 153 may be provided on the front surface of the capacitor pack 55 to protrude forward the front from the front surface of the capacitor pack 55. The first and second electrode terminals 151 and 153 may be electrically connected with the capacitor device 56.

The first and second electrode terminals 151 and 153 may have threads to be coupled to first and second connection bars 63 and 65, respectively. The first and second connection bus bars 63 and 65 may have first and second coupling holes formed at ends thereof corresponding to the first and second electrode terminals 151 and 153, respectively such that the first and second connection bus bars 63 and 65 pass through the first and second electrode terminals 151 and 153, respectively. Accordingly, after the first electrode terminal 151 of the capacitor pack 55 passes through the first coupling hole of the first connection bus bar 63, the first electrode terminal 151 may be coupled to the first coupling hole by a screw. After the second electrode terminal 153 of the capacitor pack 55 passes through the second coupling hole of the second connection bus bar 65, the second electrode terminal 153 may be coupled to the second coupling hole by a screw.

The first and second connection bus bars 63 and 65 may be connected with switching modules 17, 19, 21, and 23. Alternatively, the first and second connection bus bars 63 and 65 may be connected with first and second output electrodes 136 and 137 connected with the switching modules.

Although the first and second bus bars 63 and 65 may shapes which are bent at least one time, the present invention is not limited thereto. Although the first and second bus bars 63 and 65 may be arranged symmetrically to each other, the present invention is not limited thereto.

The first and second input bus bars 57 and 59, the first and second electrode terminals 151 and 153 of the capacitor pack 55, the first and second connection bus bars 63 and 65, and the first and second output electrodes 136 and 137 may be formed of a metallic material having superior electrical conductivity. The first and second input bus bars 57 and 59, the first and second electrode terminals 151 and 153 of the capacitor pack 55, the first and second connection bus bars 63 and 65, and the first and second output electrodes 136 and 137 may be formed the same metallic materials or metallic materials different from each other.

The power pack 13 may include the case 141 and a plurality of devices installed in the case 141.

In other words, the case 141 of the power pack 13 may have, for example, the switching module 15, a resistor 49, a self-power supply (SPS: Self Power Supply) 51, and a submodule interface (SMI: SubModule Interface) 53 mounted therein.

The switching module 15, the resistor 49, and the SPS 51, which are mounted in the case 141 of the power pack 13, may be electrically connected with each other between the first and second connection bus bars 63 and 65. The switching module 15 may include the first to fourth switching modules 17, 19, 21, and 23 as shown in FIG. 5.

The switching modules 17, 19, 21, and 23 may include switching devices 25, 27, 29, and 31, diodes 33, 35, 37, and 39, and gate drivers 41, 43, 45, and 47, respectively.

In other words, the first switching module 17 may include a first switching device 25, a first diode 33, and a first gate driver 41. The second switching module 19 may include a second switching device 27, a second diode 35, and a second gate driver 43. The third switching module 21 may include a third switching device 29, a third diode 37, and a third gate driver 45. The fourth switching module 23 may include a fourth switching device 31, a fourth diode 39, and a fourth gate driver 47.

The switching of the first to fourth switching devices 25, 27, 29, and 31 may be controlled by gate signals received from the SMI 53. For example, the first to fourth switching devices 25, 27, 29, and 31 may be turned off in response to low-level gate signals and may be turned on in response to high-level gate signals.

Although the first to fourth switching devices 25, 27, 29, and 31 may include insulated gate bipolar transistors (IGBTs), the present invention is not limited thereto.

In other words, the first switching device 25 may include a first IGBT, the second switching device 27 may include a second IGBT, the third switching device 29 may include a third IGBT, and the fourth switching device 31 may include a fourth IGBT.

According to the present invention, AC power may be converted to DC power or DC power may be converted to AC power through the operations of the first to fourth switching modules 17, 19, 21, and 23 in each of the submodules 92, 94, and 96.

The SMI 53 may integrally manage and/or control all devices mounted in the submodules 92, 94, and 96. The power pack 13 having no case 141 is shown in FIG. 10.

Figure 10:
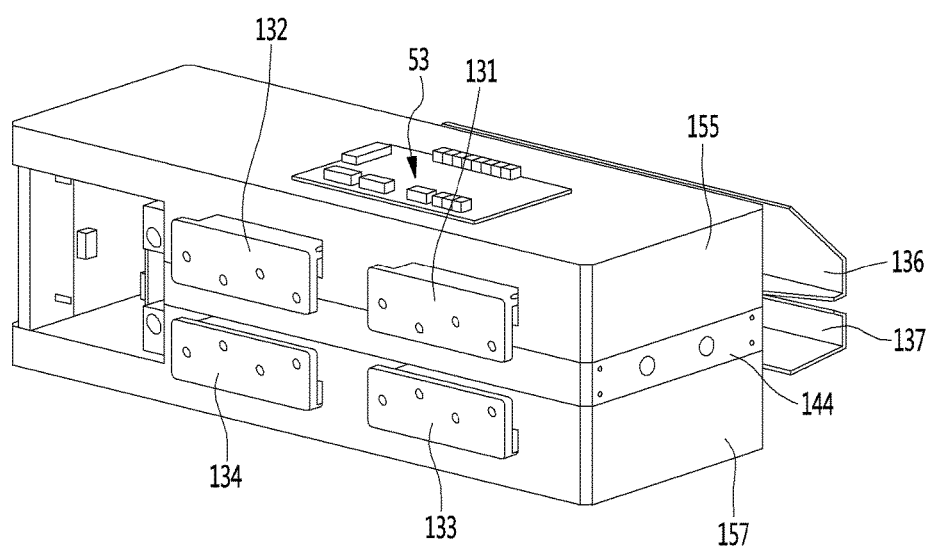
FIG. 10 is a perspective view illustrating a power pack having no case.
Figure 11A:
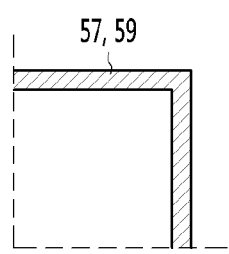
FIG. 11A illustrates input bus bars provided in a first shape according to an embodiment of the present invention.
Figure 11B:
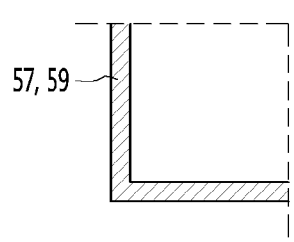
FIG. 11B illustrates input bus bars provided in a second shape according to an embodiment of the present invention.
Figure 11C:
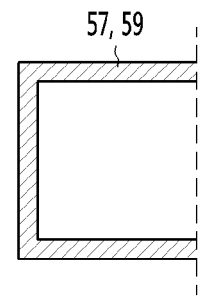
FIG. 11C illustrates input bus bars provided in a third shape according to an embodiment of the present invention.
Figure 11D:
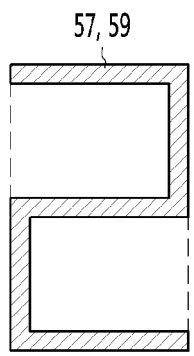
FIG. 11D illustrates input bus bars provided in a fourth shape according to an embodiment of the present invention.
Figure 11E:
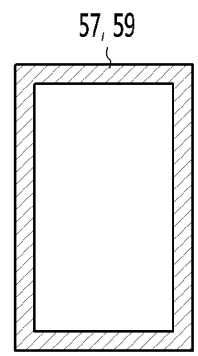
FIG. 11E illustrates input bus bars provided in a fifth shape according to an embodiment of the present invention.

As illustrated in FIG. 10, second and third plates 155 and 157 may be coupled to both sides of a first plate 144. In addition, the switching module 15 may be coupled to both sides of the first plate.

Although the switching module 15 may be sealed by the second and third plates 155 and 157, the present invention is not limited thereto.

The first plate 144 may include a cooling plate. To this end, a duct may be formed in a zig-zag pattern in the first plate 144 such that the coolant flows through the duct. The duct may be formed in various manners.

The first plate 144 may have a water inlet terminal 145 and a water outlet terminal 147 formed at one side thereof, and the water inlet terminal 145 and the water outlet terminal 147 may be connected with the entrance and the exit of the first plate 144. The water inlet terminal 145 and the water outlet terminal 147 may be connected with the first and second sub-branch pipes 77 and 79. The water inlet terminal 145 and the water outlet terminal 147 may be connected with or disconnected from the first and second sub-branch pipes 77 and 79.

For example, after the power pack 13 is introduced into each of the cabinets 91, 93, and 95 along the guide sliding rail unit 68, the first and second sub-branch pipes 77 and 79 may be connected with the water inlet terminal 145 and the water outlet terminal 147, respectively, formed at one side of the first plate 144 of the power pack 13.

For example, when the power pack 13 is replaced with new one, after the first and second sub-branch pipes 77 and 79 may be disconnected from the water inlet terminal 145 and the water outlet terminal 147 of the first plate 144, the power pack 13 may be withdrawn out of each of the cabinets 91, 93, and 95 along the guide sliding rail unit 68.

Although drawings illustrate that the water inlet terminal 145 and the water outlet terminal 147 are provided above the first plate 144, the water inlet terminal 145 and the water outlet terminal 147 may be provided under the first plate 144 or at the lateral side of the first plate 144.

First and second surfaces of the first plate 144, which face each other, may have flat surfaces. In this case, the second plate 155 and, for example, the first and second switching modules 17 and 19 are mounted on the first surface of the first plate 144, and the third plate 157 and, for example, the third and fourth switching modules 21 and 23 may be mounted on the second surface of the first plate 144. The switching module 15 and the second and third plates 155 and 157 may be coupled to the first plate 144 by using a screw.

The first plate 144 may be formed cast iron or an aluminum alloy having a superior heat radiation characteristic, but the present invention is not limited thereto.

The second and third plates 155 and 157 may be formed of the same material. The second and third plates 155 and 157 may be explosion-proof plates. In other words, even if the switching module 15 is exploded, the second and third plates 155 and 157 may be formed of an explosion-proof material to prevent a surrounding of the switching module 15 from being damaged due to the explosion. For example, although the second and third plates 155 and 157 may be formed of an epoxy glass material, the present invention is not limited thereto.

When the second and third plates 155 and 157 are mounted on the first plate 144, a cell space (not illustrated) may be defined by the first plate 144 and the second and third plates 155 and 157. The number of cell spaces may be provided as many as the number of switching modules 15.

Accordingly, when the switching module 15 is mounted on the first plate 144, the top surface of the switching module 15 may be spaced apart from the bottom surface of the second or third plates 155 and 157 by a predetermined distance. In other words, the cell space may be larger than the volume of the switching module 15.

The inner surfaces of the second and third plates 155 and 157 facing the first surface and the second surface of the first plate 144, respectively, may have recess regions recessed inward to define the cell space. The number of recess regions may be provided as many as the number of switching modules 15. Accordingly, when the second and third plates 155 and 157 are mounted on the first plate 144, the recessed region may form a cell space by the coupling of the second or third plates 155 and 157 and the first plate 144.

First and second driver boards 41 and 43, which are connected with the first and second switching modules 17 and 19 mounted on the first surface of the first plate 144, may be mounted on an outer surface opposite to the inner surface of the second plate 155. Third and fourth driver boards 45 and 47, which are connected with the third and fourth switching modules 21 and 23 mounted on the second surface of the first plate 144, may be mounted on an outer surface opposite to the inner surface of the third plate 157.

The first to fourth driver boards 41, 43, 45, and 47 may be first to fourth gate drivers illustrated in FIG. 5.

An interface 53 may be mounted on an outer surface of one of the second and third plates 155 and 157 to generate a control signal for controlling the first to fourth driver boards 41, 43, 45, and 47. The interface 53 may be named "control board". The interface 53 may be electrically connected with the first to fourth driver boards 41, 43, 45, and 47.

The first and second input electrodes 131 and 132 may be electrically connected with input terminals of the first and third switching modules 17 and 21. The third and fourth input terminals 133 and 134 may be electrically connected with input terminals of the second and fourth switching modules 19 and 23, respectively.

In detail, one end of the first input electrode 131 and one end of the third input electrode 133 may be electrically connected with the first input terminal and the third input terminal of the first and third switching modules 17 and 21, respectively, and may protrude through one area of the second plate 155 and one area of the third plate 157, respectively. Opposite ends of the first and third input electrodes 131 and 133 may be coupled to the first input bus bar 57.

In detail, one end of the second input electrode 132 and one end of the fourth input electrode 134 may be electrically connected with the second input terminal and the fourth input terminal of the second and fourth switching modules 19 and 23, respectively, and may protrude through opposite areas of the second and third plates 155 and 157, respectively. Opposite ends of the second and fourth input electrodes 132 and 134 may be coupled to the second input bus bar 59.

The first and second input bus bars 57 and 59 coupled to the first to fourth input electrodes 131 to 134 may protrude forward while extending through the case 141 as illustrated in FIG. 6.

The first output electrode 136 may be electrically connected with each of output terminals of the first and second switching modules 17 and 19. A second output electrode 137 may be connected with each of output terminals of the third and fourth switching modules 21 and 23.

In detail, one terminal of the first output electrode 136 may be electrically connected with first and second output terminals of the first and second switching modules 17 and 19 and may protrude through one area of the second plate 155. An opposite end of the first output electrode 136 may be coupled to the first connection bus bar 63.

One terminal of the second output electrode 137 may be electrically connected with third and fourth output terminals of the third and fourth switching modules 21 and 23 and may protrude through an opposite area of the third plate 157. An opposite end of the second output electrode 137 may be coupled to the second connection bus bar 65.

The first and second connection bus bars 63 and 65 coupled to the first and second output electrodes 136 and 137 may protrude rearward while passing through the case 141 as illustrated in FIG. 6.

FIGS. 11A to 11E illustrate various alternative embodiments having an input bus bar of alternate first, second, third, fourth and fifth shapes.

Referring specifically to FIGS. 11A to 11E, the first and second input bus bars 57 and 59 may be provided in various shapes.

In more detail, the sectional surface of each of the first and second input bus bars 57 and 59 according to an embodiment may be provided in the shapes of "¬", "L", "⊏", "⊐", and "□" as illustrated in FIGS. 11A to 11E.

However, the above shapes of the first and second input bus bars 57 and 59 are provided for the convenience of explanation. The user may variously modify the sectional shapes of the first and second input bus bars 57 and 59, which does not limit the scope of the present invention.

Although not illustrated in FIGS. 11A to 11E, as well as the sectional shapes of the first and second input bus bars 57 and 59, even the sectional shapes of the connection bus bars 63 and 65 may be provided in the shapes of "¬", "L", "⊏", "⊐", "□" which are identical to the sectional shapes of the first and second input bus bars 57 and 59.

The submodule according to the present invention has following effects.

According to at least one of embodiments of the present invention, the first and second input bus bars protrude forward the front from the front surface of the power pack and the bypass switch is electrically connected with the first and second input bus bars protruding forward from the power pack, thereby reducing the side volume of the power pack to reduce the volumes of the power pack and the volume of the submodule including the power pack and to increase the efficiency in the space of the power compensation device provided to stack a plurality of submodules.

According to at least one of embodiments of the present invention, since the bypass switch is mounted outside the power pack, heat emitted from the bypass switch may be natural radiated.

The above described embodiments should be considered as illustrative embodiments instead of being limitedly interpreted. The scope of the present invention should be determined through the reasonable interpretation of appended claims and equivalents of the present invention fall within the scope of the present invention.

What is claimed is:

1. A submodule comprising:
   a power pack including a plurality of switching modules;
   first and second input bus bars connected with the switching modules to protrude toward a first outside from a front surface of the power pack; and
   a bypass switch provided at the first outside of the power pack and coupled to the first and second input bus bars,
   wherein the submodule further comprises:
      a first plate mounted in the power pack;
      at least one switching module mounted on at least one surface of the first plate; and
      a second plate mounted on the at least one surface of the first plate and having at least one recess region formed in number corresponding to the number of the at least one switching module.

2. The submodule of claim 1, further comprising:
   first and second connection bus bars connected with the switching modules to protrude toward a second outside from the power pack, wherein the second outside is opposite of the first outside; and
   a capacitor pack including a capacitor and coupled to the first and second connection bus bars.

3. The submodule of claim 2, wherein the first and second input bus bars and the first and second connection bus bars have shapes which are bent at least one time.

4. The submodule of claim 2, further comprising:
   first and second electrode terminals protruding toward one side of the capacitor pack,
   wherein the first and second connection bus bars include first and second coupling holes, respectively, such that the first and second electrode terminals of the capacitor pack pass through the first and second coupling holes and are coupled to the first and second coupling holes.

5. The submodule of claim 2, further comprising:
   a sliding member disposed on one side of the power pack and one side of the capacitor pack to slidably move.

6. The submodule of claim 1, wherein the bypass switch is spaced apart from the first outside of the power pack.

7. The submodule of claim 1, wherein the bypass switch extends in a cylindrical shape.

8. The submodule of claim 1, wherein the bypass switch includes a first switch terminal having a first protrusion part protruding in a first horizontal direction from a first side of the bypass switch and a second switch terminal having a second protrusion part protruding in a second horizontal direction, which is opposite to the first horizontal direction, from a second side of the bypass switch, and
   wherein the first and second input bus bars are coupled to the first protrusion part of the first switch terminal and the second protrusion part of the second switch terminal, respectively.

9. The submodule of claim 8, wherein, based on a vertical axis of the bypass switch, the first input bus bar coupled to the first protrusion part of the first switch terminal is positioned at a first side of the bypass switch and the second input bus bar coupled to the second protrusion part of the second switch terminal is positioned at a second side of the bypass switch.

10. The submodule of claim 1, wherein the first plate includes a cooling plate.

11. The submodule of claim 1, wherein the at least one switching module is sealed by the first plate and the second plate.

12. The submodule of claim 1, wherein the at least one recess region is formed in an inner surface of the second plate facing at least one surface of the first plate.

13. The submodule of claim 1, wherein at least one cell space is formed by the coupling of the at least one recess region and the first plate.

14. The submodule of claim 13, wherein the at least one cell space has a volume larger than a volume of the at least one switching module.

15. The submodule of claim 1, further comprising:
   a control board mounted on an opposite surface to an inner surface of the second plate facing at least one surface of the first plate.

16. The submodule of claim 1, further comprising:
   a plurality of input electrodes connected with the at least one switching module and coupled to the first and second input bus bars.

17. The submodule of claim 16, wherein the input electrode protrudes through the second plate.

18. The submodule of claim 1, further comprising:
   a pipe disposed on one side of the power pack to supply coolant.

* * * * *